(12) United States Patent
Leavy et al.

(10) Patent No.: US 8,365,380 B1
(45) Date of Patent: Feb. 5, 2013

(54) LAPTOP COMPUTER REPAIR KIT

(76) Inventors: Jerenita Leavy, Birmingham, AL (US); Ambreia Leavy, Birmingham, AL (US)

(*) Notice: Subject to any disclaimer, the term of this patent is extended or adjusted under 35 U.S.C. 154(b) by 494 days.

(21) Appl. No.: 12/798,072

(22) Filed: Mar. 30, 2010

(51) Int. Cl.
 *B23P 19/04* (2006.01)
(52) U.S. Cl. ............... 29/402.03; 29/402.08; 29/525.11
(58) Field of Classification Search .............. 206/576, 206/582, 223, 320, 372, 373, 216, 701, 577, 206/818, 459.5, 459.1; 29/762, 764, 402.01, 29/402.03, 402.04, 402.08, 525.11; 312/223.1, 312/223.2, 223.3; 434/379, 118
See application file for complete search history.

(56) References Cited

U.S. PATENT DOCUMENTS

| | | | |
|---|---|---|---|
| 2,878,586 A * | 3/1959 | Ohlsson | 434/80 |
| 3,186,323 A * | 6/1965 | Niehaus | 355/79 |
| 3,659,353 A * | 5/1972 | D'Agrosa | 434/73 |
| 3,716,935 A * | 2/1973 | Friederichs | 40/621 |
| 5,598,921 A | 2/1997 | Hunt | |
| 5,860,205 A * | 1/1999 | Davis | 29/750 |
| 5,967,633 A | 10/1999 | Jung | |
| 6,392,876 B1 * | 5/2002 | Ramonowski | 361/679.32 |
| 6,618,245 B2 | 9/2003 | Diaz | |
| 7,511,951 B2 * | 3/2009 | Liu et al. | 361/679.55 |
| 2002/0144032 A1 * | 10/2002 | Kriege et al. | 710/62 |

* cited by examiner

*Primary Examiner* — Mickey Yu
*Assistant Examiner* — Jenine Pagan
(74) *Attorney, Agent, or Firm* — Paul R. Martin

(57) ABSTRACT

A unit and a method of using that unit during repair of a laptop computer are disclosed. The unit includes a magnetic board having special markings located thereon which correspond to the locations of screws used to hold a backplate of a laptop computer in place on the housing of the computer. As screws are removed from the backplate, they are placed on the markings which correspond to the location of those screws in the computer. The magnetic nature of the board holds those screws in place whereby the screws will not be lost and the technician knows exactly what screw goes where during the re-assembly process.

4 Claims, 1 Drawing Sheet

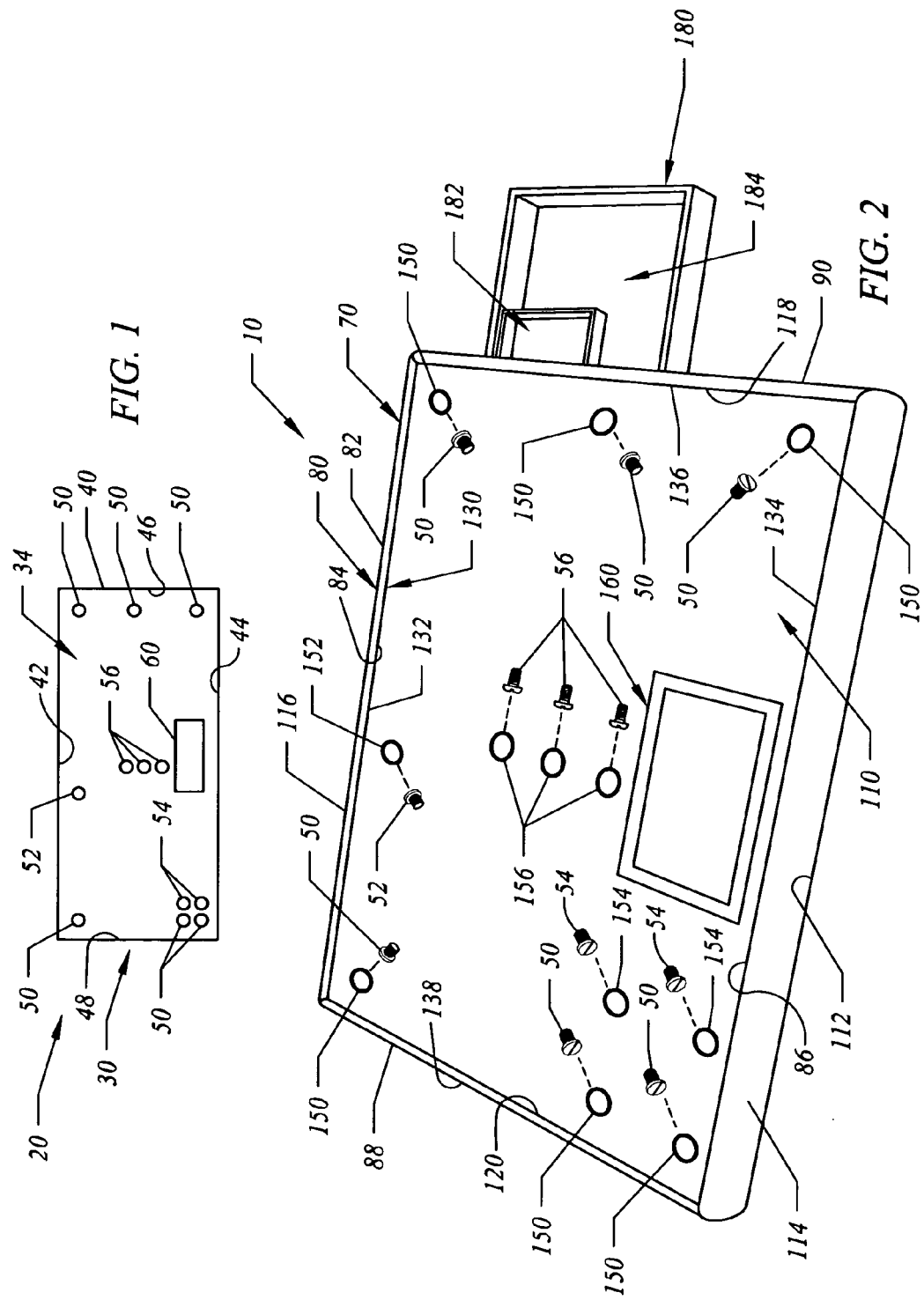

LAPTOP COMPUTER REPAIR KIT

TECHNICAL FIELD OF THE INVENTION

The present invention relates to the general art of laptop computers, and to the particular field of kits used in the repair of such computers.

BACKGROUND OF THE INVENTION

The laptop computer is a compact and portable computer that minimizes the size of all of the electronic devices inside the casing with a thickness not exceeding more than two magazines. Reducing the size of the computer results in a reduced weight and a higher portability, substantially with the same performance as a desktop computer.

Because of the reduced size of the newer personal computers, it is necessary to pack the components into a smaller space. However, the more tightly packed the components are, the more difficult it is to assemble and disassemble a computer. For example, it is difficult for a computer owner or repair person to perform warranty repair work if the computer configuration does not provide easy access to various components which may require maintenance or replacement during the life of the computer. In densely packed housings, it is often necessary to go through the tedious process of removing one or more components using special tools and techniques in order to gain access to the component which must be tested or replaced. This can be extremely expensive and time consuming.

This is especially so if many screws must be removed and then replaced to re-assemble the computer after the repair work has been completed.

One common problem is the loss or misplacement of screws once they are removed. A worker often spends much wasted time looking for screws to replace. This problem is exacerbated if the screws are special to a particular location on the computer. Thus, not only might a screw be misplaced and then must be retrieved, some screws must be exactly replaced. This makes the problem even more wasteful and annoying.

Therefore, there is a need for a means and a method for avoiding the annoying and time-consuming problem of losing the screws removed from a laptop computer during a repair operation while also expediting the replacement of those screws during the re-assembly process.

SUMMARY OF THE INVENTION

The above-discussed disadvantages of the prior art are overcome by a unit which includes a magnetic board having special markings located thereon which correspond to the locations of screws used to hold a backplate of a laptop computer in place on the housing of the computer. As screws are removed from the backplate, they are placed on the markings which correspond to the location of those screws in the computer. The magnetic nature of the board holds those screws in place whereby the screws will not be lost and the technician knows exactly what screw goes where during the re-assembly process.

The unit embodying the present invention will help laptop technicians keep the screws that are removed from a laptop being repaired by keeping the removed screws in place exactly where they are to be replaced when the computer is reassembled after repair. There will be no more guessing, no dropping tiny screws in carpet, under desk and losing the place where the screws go back to replace the laptop back cover. The pad improves the reliability of repairs by preventing the loss of screws and allowing the technician to know exactly which each removed screw goes as it relates to the design of the laptop bottom cover. A method of repairing a laptop computer includes removing screws to remove the backplate, and then placing those removed screws in the areas marked on the magnetic plate which are located on the magnetic plate in positions which correspond to the positions of the screws in the backplate. The screws are then held in place until the backplate is replaced, at which time, the screws are easily located and can be efficiently replaced because there is no guesswork associated with where to replace the screws.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 2 is a perspective view of a laptop computer repair kit embodying the present invention.

FIG. 1 shows a backplate associated with a laptop computer.

DETAILED DESCRIPTION OF THE INVENTION

Referring to the figures, it can be understood that the present invention is embodied in a kit 10 for use during repair of a laptop computer 20. The laptop computer includes a body 30 having a backplate 34 covering the interior of the computer. The backplate is removably mounted on the body so it can be removed for repair of the computer. The backplate has a perimeter 40 which includes two sides 42 and 44 and two ends 46 and 48. The backplate is releasably attached to the body by means of a plurality of screws which are strategically placed and which include a first plurality 50 of screws located near the perimeter of the backplate adjacent to the ends of the backplate, at least one screw 52 located near the perimeter of the backplate adjacent to at least one side of the backplate, a second plurality 54 of screws located adjacent to some of the first plurality of screws and a third plurality 56 of screws located near the center region of the backplate. A cover 60 closes a battery compartment.

The kit further comprises a screw storage unit 70 for storing screws removed from the backplate in a manner which maintains those removed screws in locations which correspond to the locations used to attach the backplate to the housing of the computer. Not only will the screws not be lost, they will be maintained in a location which makes re-assembling the computer efficient and easy. Unit 70 includes a body 80 having a perimeter 82 which includes sides 84 and 86 and ends 88 and 90. Body 80 has a size and shape which matches the size and shape of the backplate of the laptop computer.

A screw storage board 110 has a perimeter 112 which includes sides 114 and 116 and ends 118 and 120. Body 80 has a size and shape which matches the size and shape of the backplate of the laptop computer. Screw storage board 110 is magnetic and includes a perimeter 130 which includes two sides 132 and 134 and two ends 136 and 138. Magnetic board 110 includes marked areas for storing the screws from the laptop computer after those screws have been removed from the computer during a repair operation. The marked areas include a first plurality 150 of marked screw areas located near the perimeter of the board adjacent to the ends of the board and which correspond to the location of the first plurality 50 of screws attaching the backplate to the body of the laptop computer, at least one marked screw area 152 located near the perimeter of the screw storage board adjacent to at least one side of the board and which corresponds to the location of the at least one screw 52 attaching the backplate to the body of the laptop computer, a second plurality 154 of marked screw areas located adjacent to some of the first plurality 150 of marked screw areas and which correspond to the location of the second plurality 54 of screws attaching the backplate to the body of the laptop computer and a third plurality 156 of marked screw areas located near the center region of the backplate and which correspond to the location of the third plurality 56 of screws attaching the backplate to the body of the laptop computer. The marked areas 150, 152, 154 and 156 on board 110 are located with respect to the perimeter of the board to be in locations that exactly correspond to the locations of the corresponding screws 50, 52, 54 and 56 of the backplate with respect to the perimeter of the backplate. Removed screws are placed in the corresponding marked areas where they are held by magnetic force so they will not be lost. Thus, for example, as indicated in FIG. 2, screws 50 are placed in marked areas 150, screw 52 is stored in area 152, screws 54 are stored in areas 154 and screws 56 are stored in areas 156. Screws are easily found and replaced in the exact spot as they are located to correspond to the screw hole from which they have been removed.

A special marked area 160 is located on the storage board in a position to correspond to the location of battery compartment cover 60. The marked area 160 will help a user orient the storage board in exact accordance with the layout of the computer backplate so there will be no doubt as to where removed screws are to be placed for storage during a repair process.

A storage drawer 180 is slidably located on one end of the body of the screw storage unit and includes a first storage area 182 for storing extra screws and a second storage area 184 for storing tools.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A kit for use during repair of a laptop computer comprising:
   A) a laptop computer having a body and a backplate covering the interior of the computer, the backplate having a perimeter which includes two sides and two ends, the backplate being releasably attached to the body by means of a plurality of screws which are strategically placed and which include a first plurality of screws located near the perimeter of the backplate adjacent to the ends of the backplate, at least one screw located near the perimeter of the backplate adjacent to at least one side of the backplate, a second plurality of screws located adjacent to some of the first plurality of screws and a third plurality of screws located near the center region of the backplate; and
   B) a screw storage unit for storing screws removed from the backplate, the unit including
      (1) a body having a perimeter which includes sides and ends, the body having a size and shape which matches the size and shape of the backplate of the laptop computer,
      (2) a screw storage board having a perimeter which includes sides and ends, a body having a size and shape which matches the size and shape of the backplate of the laptop computer, the screw storage board being magnetic and including a perimeter which includes two sides and two ends, the magnetic board including marked areas for storing the screws from the laptop computer, the marked areas including a first plurality of marked screw areas located near the perimeter of the board adjacent to the ends of the board and which are located in the exact position with respect to the perimeter of the board as the first plurality of screws attaching the backplate to the body of the laptop computer are in with respect to the perimeter of the backplate, at least one marked screw area located near the perimeter of the screw storage board adjacent to at least one side of the board and which corresponds on the board with respect to the perimeter of the board to the exact location of the at least one screw attaching the backplate to the body of the laptop computer with respect to the perimeter of the backplate, a second plurality of marked screw areas located adjacent to some of the first plurality of marked screw areas and which are in the exact position with respect to the perimeter of the board as the second plurality of screws attaching the backplate to the body of the laptop computer are in with respect to the perimeter of the backplate, and a third plurality of marked screw areas located near the center region of the backplate and which are located with respect to the perimeter of the board to correspond to the exact location of the third plurality of screws attaching the backplate to the body of the laptop computer are in with respect to the perimeter of the backplate, and
      (3) a storage drawer slidably located on one end of the body of the screw storage unit.

2. The kit defined in claim 1 wherein the storage drawer includes a compartment for screws and a second compartment for tools.

3. The kit defined in claim 2 wherein the backplate of the laptop computer has a battery case cover located near one side of the backplate and the screw storage unit further includes an indicator mark on the screw storage board which corresponds to the location of the battery case cover of the backplate of the laptop computer.

4. A method of repairing a laptop computer comprising steps of:
   A) providing a laptop computer having a perimeter which includes two sides and two ends, a backplate being releasably attached to a body by means of a plurality of screws which are strategically placed and which include a first plurality of screws located near the perimeter of the backplate adjacent to the ends of the backplate, at least one screw located near the perimeter of the backplate adjacent to at least one side of the backplate, a second plurality of screws located adjacent to some of the first plurality of screws and a third plurality of screws located near the center region of the backplate;
   B) providing a screw storage unit for storing screws removed from the backplate, the unit including (1) a body having a perimeter which includes sides and ends, the body having a size which matches the size of the backplate of the laptop computer, and (2) a screw storage board having a perimeter which includes sides and ends, a body having a size which matches the size of the backplate of the laptop computer, the screw storage board being magnetic and including a perimeter which includes two sides and two ends, the magnetic board including marked areas for storing the screws from the laptop computer, the marked areas including a first plurality of marked screw areas located near the perimeter of the board adjacent to the ends of the board and which correspond to the location of the first plurality of screws attaching the backplate to the body of the laptop computer, at least one marked screw area located near the perimeter of the screw storage board adjacent to at least one side of the board and which corresponds to the location of the at least one screw attaching the backplate to the body of the laptop computer, a second plurality of marked screw areas located adjacent to some of the first plurality of marked screw areas and which correspond to the location of the second plurality of screws attaching the backplate to the body of the laptop computer and a third plurality of marked screw areas located near the center region of the backplate and which correspond to the location of the third plurality of screws attaching the backplate to the body of the laptop computer;

C) removing the screws attaching the backplate to the laptop computer for removing the backplate from the laptop computer;

D) during removal of the screws placing each screw after removal on a marked screw area corresponding to the location of the screw when the screw attaches the backplate to the laptop computer; and E) maintaining the removed screws in the marked areas during repair of the computer.

\* \* \* \* \*